United States Patent
Mori et al.

(10) Patent No.: US 10,053,097 B2
(45) Date of Patent: Aug. 21, 2018

(54) VEHICLE CONTROL APPARATUS AND VEHICLE CONTROL METHOD

(71) Applicant: Mitsubishi Electric Corporation, Tokyo (JP)

(72) Inventors: Nobuhide Mori, Tokyo (JP); Keiichi Enoki, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 134 days.

(21) Appl. No.: 15/111,540

(22) PCT Filed: Mar. 13, 2014

(86) PCT No.: PCT/JP2014/056663
§ 371 (c)(1),
(2) Date: Jul. 14, 2016

(87) PCT Pub. No.: WO2015/136664
PCT Pub. Date: Sep. 17, 2015

(65) Prior Publication Data
US 2016/0325748 A1  Nov. 10, 2016

(51) Int. Cl.
*G06F 19/00* (2018.01)
*B60W 30/18* (2012.01)
(Continued)

(52) U.S. Cl.
CPC ....... *B60W 30/18009* (2013.01); *B60L 15/20* (2013.01); *B60L 15/2009* (2013.01);
(Continued)

(58) Field of Classification Search
CPC .......... B60W 30/18009; B60W 10/00; B60W 10/08; B60W 10/184; B60W 2510/081;
(Continued)

(56) References Cited

U.S. PATENT DOCUMENTS

| | | | |
|---|---|---|---|
| 9,561,738 B2* | 2/2017 | Ogawa | B60L 3/04 |
| 2008/0154472 A1* | 6/2008 | Okuda | B60K 6/44 701/93 |

(Continued)

FOREIGN PATENT DOCUMENTS

| | | |
|---|---|---|
| JP | 2007-83993 A | 4/2007 |
| JP | 2011-185206 A | 9/2011 |

(Continued)

OTHER PUBLICATIONS

International Search Report for PCT/JP2014/056663 dated Apr. 28, 2014.

*Primary Examiner* — Ronnie M Mancho
(74) *Attorney, Agent, or Firm* — Sughrue Mion, PLLC; Richard C. Turner (57) ABSTRACT

An object of this invention is to obtain a vehicle control apparatus with which departure over a bump can be identified accurately, and when departure over the bump is identified, a required driving force can be controlled to an appropriate value. A departure over bump identification unit identifies departure over a bump, in which an electric vehicle travels over the bump in order to depart, when a motor rotation speed is equal to or lower than a predetermined first rotation speed and an accelerator pedal depression amount remains at or above a predetermined accelerator pedal depression amount continuously for a predetermined first period, and a drive control unit sets a required driving force of a motor at zero, regardless of the accelerator pedal depression amount, and then increases the required driving force at a constant speed, when departure over the bump is identified.

13 Claims, 4 Drawing Sheets

(51) Int. Cl.
*B60L 15/20* (2006.01)
*B60W 10/00* (2006.01)
*B60W 10/08* (2006.01)
*B60W 10/184* (2012.01)
*B60L 11/18* (2006.01)

(52) U.S. Cl.
CPC ............ *B60W 10/00* (2013.01); *B60W 10/08* (2013.01); *B60W 10/184* (2013.01); *B60L 11/18* (2013.01); *B60L 2210/42* (2013.01); *B60L 2250/26* (2013.01); *B60L 2250/28* (2013.01); *B60L 2270/145* (2013.01); *B60W 2510/081* (2013.01); *B60W 2540/10* (2013.01); *B60W 2540/12* (2013.01); *B60W 2710/083* (2013.01); *B60Y 2200/91* (2013.01); *B60Y 2300/22* (2013.01); *Y02T 10/645* (2013.01); *Y02T 10/7275* (2013.01)

(58) Field of Classification Search
CPC ........... B60W 2540/10; B60W 2540/12; B60L 15/20; B60L 15/2009; B60L 11/18; B60L 2210/42; B60L 2250/26; B60L 2250/28; B60L 2270/145
USPC ....................................................... 701/1, 22
See application file for complete search history.

(56) References Cited

U.S. PATENT DOCUMENTS

2012/0159916 A1* 6/2012 Ishii ...................... A01D 34/64
  56/10.2 A
2012/0295757 A1* 11/2012 Watanabe ............. B60W 10/06
  477/4

FOREIGN PATENT DOCUMENTS

| JP | 2013-5560 A | 1/2013 |
| JP | 2013-107432 A | 6/2013 |
| JP | 2013-166415 A | 8/2013 |

\* cited by examiner

VEHICLE CONTROL APPARATUS AND VEHICLE CONTROL METHOD

CROSS REFERENCE TO RELATED APPLICATIONS

This application is a National Stage of International Application No. PCT/JP2014/056663 filed Mar. 13, 2014, the contents of which are incorporated herein by reference in its entirety.

TECHNICAL FIELD

This invention relates to a vehicle control apparatus and a vehicle control method for an electric vehicle having a motor that transmits power to an axle, an inverter that drives the motor, and a battery that supplies power to the inverter.

BACKGROUND ART

For all vehicles, including electric vehicles, it may sometimes be necessary to travel over a bump in order to depart. When a vehicle travels over a bump during departure, it is necessary to identify departure over the bump accurately and control a required driving force to an appropriate value so that passenger comfort is not impaired.

In a conventional method of identifying departure over a bump, departure over the bump is identified when a vehicle body speed of the vehicle is zero and the required driving force of the vehicle equals or exceeds a predetermined value (see PTL 1, for example).

In another conventional method of identifying departure over a bump, departure over the bump is identified when a vehicle speed difference obtained by subtracting a detected vehicle speed from an estimated vehicle speed, the estimated vehicle speed being estimated on the basis of the driving force of the vehicle as a speed of the vehicle when the bump is absent, equals or exceeds a predetermined vehicle speed within a predetermined detection period following the start of a reduction in the detected vehicle speed (see PTL 2, for example).

CITATION LIST

Patent Literature

[PTL 1]
Japanese Patent Application Publication No. 2011-185206
[PTL 2]
Japanese Patent Application Publication No. 2013-5560

SUMMARY OF INVENTION

Technical Problem

However, the prior art has the following problems.

To identify departure over a bump in PTL 1, departure over the bump is identified when the vehicle body speed of the vehicle is zero and the required driving force of the vehicle equals or exceeds the predetermined value, but in an extremely low speed region, noise is likely to be generated in a vehicle wheel speed sensor used to detect the vehicle body speed of the vehicle, and as a result, a determination of zero as the vehicle body speed may not be established.

Further, to identify departure over a bump in PTL 2, departure over the bump is identified on the basis of the vehicle speed difference in consideration of the fact that when the vehicle reaches the bump while traveling, the bump acts as a load, leading to a reduction in the vehicle speed. However, when the vehicle travels over the bump from a condition in which the vehicle wheels are pressed against the bump, the vehicle speed is zero, and it may therefore be impossible to detect the vehicle speed difference. As a result, it may be impossible to detect the bump.

Furthermore, neither PTL 1 nor PTL 2 includes any specific description relating to appropriate control of the required driving force when departure over a bump is identified.

This invention has been designed to solve the problems described above, and an object thereof is to obtain a vehicle control apparatus and a vehicle control method with which departure over a bump can be identified accurately, and when departure over the bump is identified, a required driving force can be controlled to an appropriate value.

Solution to Problem

A vehicle control apparatus according to this invention is a vehicle control apparatus for an electric vehicle that travels using power from a motor, and includes a motor rotation speed detection unit that detects a rotation speed of the motor as a motor rotation speed, an accelerator pedal depression amount detection unit that detects a depression amount of an accelerator pedal of the electric vehicle as an accelerator pedal depression amount, a departure over bump identification unit that identifies departure over a bump, in which the electric vehicle travels over the bump in order to depart, when the motor rotation speed is equal to or lower than a predetermined first rotation speed and the accelerator pedal depression amount remains at or above a predetermined accelerator pedal depression amount continuously for a predetermined first period, and a drive control unit that sets a required driving force of the motor at zero, regardless of the accelerator pedal depression amount, and then increases the required driving force at a constant speed, when departure over the bump is identified.

Further, a vehicle control method according to this invention is a vehicle control method for an electric vehicle that travels using power from a motor, and includes a motor rotation speed detection step for detecting a rotation speed of the motor as a motor rotation speed, an accelerator pedal depression amount detection step for detecting a depression amount of an accelerator pedal of the electric vehicle as an accelerator pedal depression amount, a departure over bump identification step for identifying departure over a bump, in which the electric vehicle travels over the bump in order to depart, when the motor rotation speed is equal to or lower than a predetermined first rotation speed and the accelerator pedal depression amount remains at or above a predetermined accelerator pedal depression amount continuously for a predetermined first period, and a drive control step for setting a required driving force of the motor at zero, regardless of the accelerator pedal depression amount, and then increasing the required driving force at a constant speed, when departure over the bump is identified.

Advantageous Effects of Invention

With the vehicle control apparatus and vehicle control method according to this invention, in the departure over bump identification unit (step), departure over a bump, in which the electric vehicle travels over the bump in order to depart, is identified when the motor rotation speed is equal to or lower than the predetermined first rotation speed and the accelerator pedal depression amount remains at or above the predetermined accelerator pedal depression amount continuously for the predetermined first period, and in the drive control unit (step), the required driving force of the motor is set at zero, regardless of the accelerator pedal depression amount, whereupon the required driving force is increased at a constant speed when departure over the bump is identified. Hence, departure over a bump can be identified accurately, and when departure over the bump is identified, the required driving force can be controlled to an appropriate value.

DESCRIPTION OF EMBODIMENTS

A preferred embodiment of a vehicle control apparatus and a vehicle control method according to this invention will be described below using the drawings. In the drawings, identical or corresponding parts are illustrated using identical reference symbols.

First Embodiment

Figure 1:
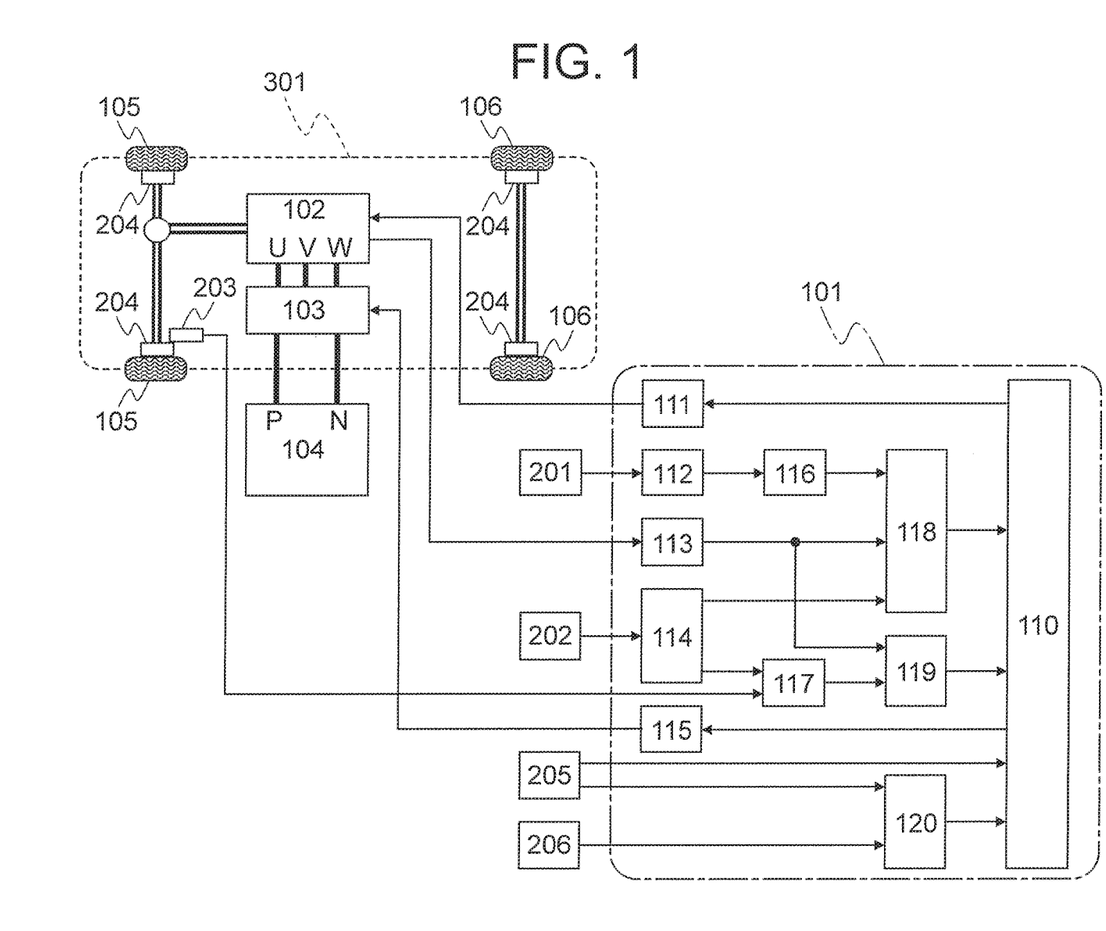
FIG. 1 is a block diagram showing a configuration of an electric vehicle to which a vehicle control apparatus according to a first embodiment of this invention is applied.

FIG. 1 is a block diagram showing a configuration of a vehicle (an electric vehicle) 301 to which a vehicle control apparatus 101 according to a first embodiment of this invention is applied. FIG. 1 shows a powertrain of the vehicle 301 together with a control system thereof, the vehicle 301 being a front motor/front wheel drive type vehicle having a function for improving travel performance and drivability when traveling over a bump.

In FIG. 1, the vehicle 301 includes a vehicle control apparatus (a control unit) 101, a motor 102, an inverter 103, a battery 104, drive wheels (front wheels) 105, and driven wheels (rear wheels) 106.

Further, the vehicle control apparatus 101 includes a drive control unit (a microcomputer) 110, a motor control unit 111, a shift position determination unit 112, a motor rotation speed detection unit 113, an accelerator pedal depression amount detection unit 114, an inverter control unit 115, a forward/reverse determination unit 116, a required driving force control unit 117, a departure over bump identification unit 118, a travel over bump start point identification unit 119, and a brake apparatus operation detection unit 120.

Furthermore, a shift position switch 201, an accelerator position switch 202, a vehicle speed sensor 203, an antilock brake system 204, a brake stroke sensor 205, and a parking brake switch 206 are provided in the vehicle 301.

The vehicle control apparatus 101 performs overall control of the motor 102, the inverter 103, and the battery 104. This control will be described in detail below. The motor 102 drives the vehicle 301. The inverter 103 converts a voltage output by the battery 104 from a direct current to an alternating current, and supplies the alternating current voltage to the motor 102. The battery 104 serves as a power supply for driving the motor 102 and a storage device for storing regenerated energy. A lithium ion battery or the like, for example, is used as the battery 104.

The drive wheels 105 enable the vehicle 301 to travel by transmitting driving force from the motor 102 to a road surface. Further, the driven wheels 106 enable the vehicle 301 to travel by rotating in synchronization with rotation of the drive wheels 105.

Furthermore, the drive control unit 110 of the vehicle control apparatus 101 executes calculation processing in relation to various input information, and outputs calculation processing results. The drive control unit 110 also includes a learning unit function.

The motor control unit 111 controls the inverter 103 such that the motor 102 generates a driving force specified by the vehicle control apparatus 101. More specifically, the motor control unit 111 controls a switching signal of the inverter 103 ON and OFF in accordance with signals from a current sensor built into the inverter 103, an angular position sensor (a resolver, for example) built into the motor 102, and so on. Note that information is exchanged between the vehicle control apparatus 101 and the motor control unit 111 using CAN communication or the like.

The shift position determination unit 112 determines a shift position of the vehicle 301 using information from the shift position switch 201. The motor rotation speed detection unit 113 converts the signal from the angular position sensor (a resolver, for example) or the like built into the motor 102 into a rotation speed of the motor 102. The accelerator pedal depression amount detection unit 114 converts an analog signal from the accelerator position switch 202 into an accelerator pedal depression amount.

The inverter control unit 115 performs vehicle speed control on the motor 102 in accordance with a variable voltage/variable frequency alternating current power supply using the inverter 103. The forward/reverse determination unit 116 determines an advancement direction (forward or reverse) of the vehicle 301 on the basis of output from the shift position determination unit 112.

The required driving force control unit 117 converts output from the vehicle speed sensor 203 and output from the accelerator pedal depression amount detection unit 114 into a required driving force required by the vehicle 301. The departure over bump identification unit 118 determines whether or not the vehicle 301 is about to travel over a bump in order to depart on the basis of output from the forward/reverse determination unit 116, output from the motor rotation speed detection unit 113, and the output from the accelerator pedal depression amount detection unit 114.

The travel over bump start point identification unit 119 determines whether or not the vehicle 301 has started to travel over the bump on the basis of the output from the motor rotation speed detection unit 113 and output from the required driving force control unit 117. The brake apparatus operation detection unit 120 determines an operating condition of a brake apparatus provided in the vehicle 301 on the basis of output from the brake stroke sensor 205 and output from the parking brake switch 206.

The shift position switch 201 is attached to a shift lever unit (not shown), and outputs a shift position. The accelerator position switch 202 is attached to an accelerator pedal unit (not shown), and converts an accelerator pedal depression position into an analog signal. The vehicle speed sensor 203 generates a pulse signal corresponding to the speed of the vehicle 301 on the basis of output from a vehicle wheel speed sensor attached to the drive wheels 105.

The antilock brake system 204 is attached to the drive wheels 105 and driven wheels 106, and generates an optimum braking force in accordance with the condition of the vehicle 301. The brake stroke sensor 205 is attached to a brake pedal unit (not shown), and converts a brake pedal depression position into an analog signal. The parking brake switch 206 is capable of recognizing an operation of a brake system for locking (fixing) the driven wheels 106 of the vehicle 301.

Figure 2:
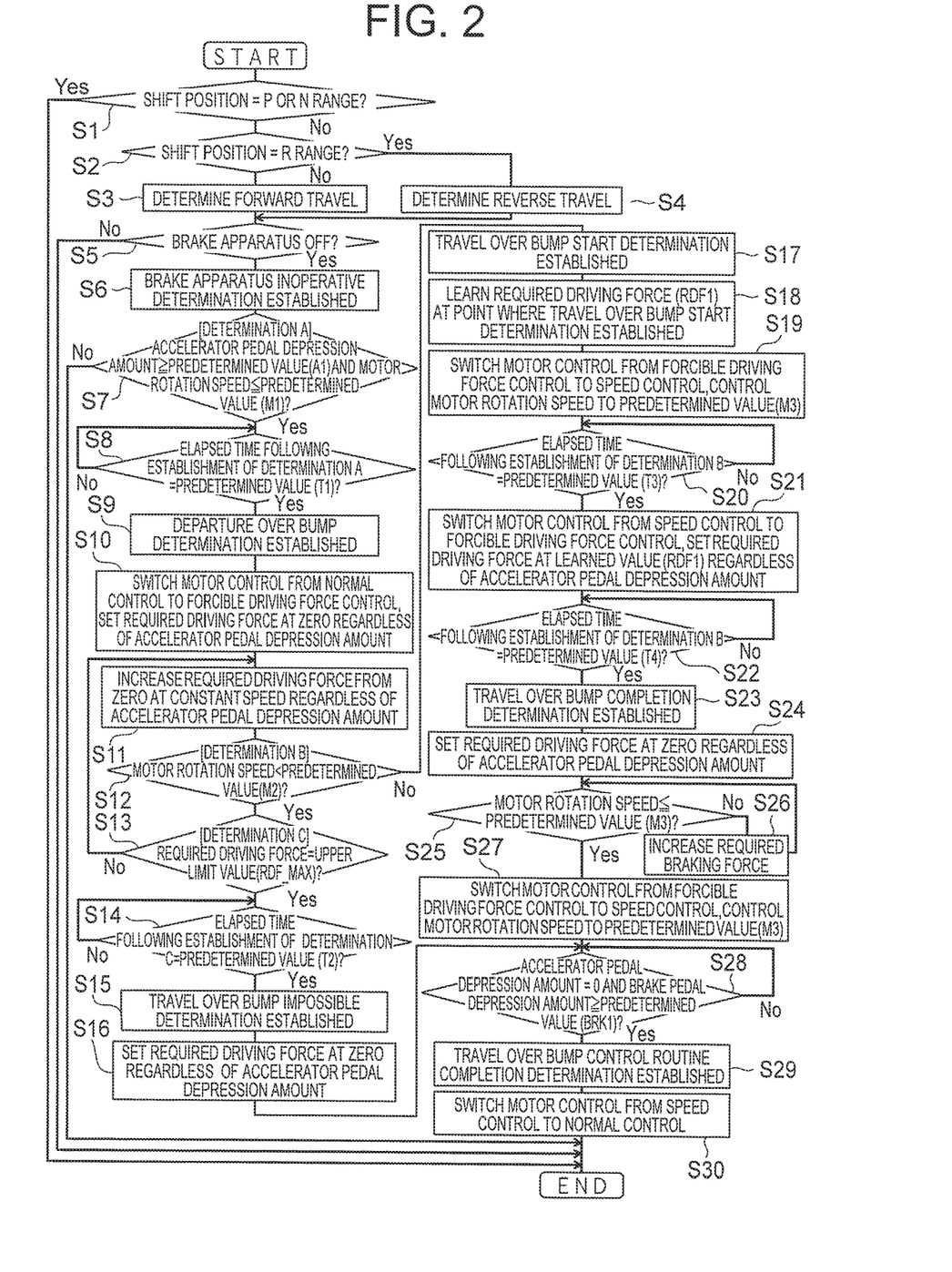
FIG. 2 is a flowchart showing control processing executed by the vehicle control apparatus according to the first embodiment of this invention.

Next, control processing executed by the vehicle control apparatus 101 according to first embodiment of this invention will be described with reference to a flowchart shown in FIG. 2. FIG. 2 is a schematic view showing an example in which the vehicle 301 travels forward over a bump, the vehicle 301 being a front motor/front wheel drive type vehicle having a function for improving travel performance and drivability when traveling over a bump. Note that the flowchart shown in FIG. 2 is executed by the vehicle control apparatus 101 at predetermined period intervals.

First, a determination is made as to whether or not the shift position of the vehicle 301 is in either a P range or an N range (step S1). At this time, the shift position determination unit 112 determines the shift position on the basis of output from the shift position switch 201.

When it is determined in step S1 that the shift position is in either the P range of the N range (i.e. Yes), the processing of FIG. 2 is terminated as is.

When it is determined in step S1 that the shift position is not in either the P range or the N range (i.e. No), on the other hand, the vehicle 301 is determined to be in a shift position where travel is possible, and a determination is made as to whether or not the shift position is in an R range (step S2). At this time, the forward/reverse determination unit 116 determines the shift position on the basis of the output from the shift position switch 201.

When it is determined in step S2 that the shift position is not in the R range (and also not in the P range or the N range) (i.e. No), the travel direction of the vehicle 301 is determined to be the forward travel direction (step S3).

When it is determined in step S2 that the shift position is in the R range (i.e. Yes), on the other hand, the travel direction of the vehicle 301 is determined to be the reverse travel direction (step S4).

Note that by having the forward/reverse determination unit 116 determine the travel direction (forward travel or reverse travel) of the vehicle 301, the sign of the required driving force required to travel over a bump can be switched, and as a result, travel over bump control can be realized regardless of the travel direction. Accordingly, identical drivability can be realized regardless of the travel direction of the vehicle 301, with the result that shock generated when traveling over a bump can be reduced and troublesome accelerator pedal operations can be eliminated.

Particularly in a case where the vehicle 301 travels over a bump in order to depart while reversing, a driver may not depress the accelerator pedal sufficiently due to poor rearward visibility and for fear of accelerating after traveling over the bump, and as a result, it may be impossible to travel over the bump. With the vehicle control apparatus 101 according to the first embodiment of this invention, these problems can be eliminated.

Next, a determination is made as to whether or not the brake apparatus is OFF (step S5). At this time, the brake apparatus operation detection unit 120 determines the operating condition of the brake apparatus of the vehicle 301 on the basis of the output from the brake stroke sensor 205 and the output from the parking brake switch 206.

When it is determined in step S5 that the brake apparatus is not OFF (i.e. No), the processing of FIG. 2 is terminated as is.

Note that when the accelerator pedal is depressed while the brake apparatus of the vehicle 301 is operative, an excessive required driving force may be generated such that the vehicle 301 jumps forward at the moment the brake apparatus is released. Hence, by adding a determination condition relating to the operating condition of the brake apparatus, the vehicle 301 can be prevented from jumping forward.

When it is determined in step S5 that the brake apparatus is OFF (i.e. Yes), on the other hand, a brake apparatus inoperative determination is established (step S6).

Next, a determination is made as to whether or not the accelerator pedal depression amount equals or exceeds a predetermined value A1 (an accelerator pedal depression amount) set in advance as desired, and whether or not the motor rotation speed is equal to or lower than a predetermined value M1 (a first rotation speed) determined in advance by experiment or analysis (i.e. whether or not a determination A is established) (step S7). At this time, the departure over bump identification unit 118 performs the determination on the basis of the output from the accelerator pedal depression amount detection unit 114 and the motor rotation speed detection unit 113.

When it is determined in step S7 that the accelerator pedal depression amount is smaller than the predetermined value A1 or that the motor rotation speed is higher than the predetermined value M1 (when determination A is not established) (i.e. No), the processing of FIG. 2 is terminated as is.

When it is determined in step S7 that the accelerator pedal depression amount equals or exceeds the predetermined value A1 and the motor rotation speed is equal to or lower than the predetermined value M1 (when determination A is established) (i.e. Yes), on the other hand, a determination is made as to whether or not an elapsed time following establishment of this condition has reached a predetermined value T1 (a first time) determined in advance by experiment or analysis (step S8). At this time, the departure over bump identification unit 118 performs the determination using an inbuilt timer.

When it is determined in step S8 that the elapsed time has not reached the predetermined value T1 (i.e. No), the routine returns to step S8, where a similar determination is executed until the predetermined value T1 elapses.

When it is determined in step S8 that the elapsed time has reached the predetermined value T1 (i.e. Yes), on the other hand, it is determined that the vehicle 301 is about to travel over a bump in order to depart, and therefore a departure over bump determination is established (step S9).

A vehicle body speed is typically detected using the vehicle wheel speed sensor provided on the drive wheels 105 and the driven wheels 106, but in an extremely low speed region, noise is likely to be generated in the vehicle wheel speed sensor. Therefore, by estimating the vehicle body speed at a motor rotation speed at which the effects of noise are reduced and adding the continuous elapsed time following establishment of the determination condition of step S7 to the determination condition relating to departure over a bump, departure over a bump can be identified accurately.

Next, when departure over a bump is identified, motor control is switched from normal control (driving force control) corresponding to the accelerator pedal depression amount to forcible driving force control in which the required driving force is applied regardless of the accelerator pedal depression amount, with the result that the required driving force is controlled to zero regardless of the accelerator pedal depression amount (step S10). At this time, the drive control unit 110 sets the required driving force at zero regardless of the accelerator pedal depression amount.

Next, the required driving force is increased gradually from zero at a constant speed regardless of the accelerator pedal depression amount (step S11). At this time, the drive control unit 110 increases the required driving force at a constant speed regardless of the accelerator pedal depression amount. By increasing the required driving force gradually in this manner, troublesome accelerator pedal operations can be eliminated.

Next, a determination is made as to whether or not the motor rotation speed is lower than a predetermined value M2 (a second rotation speed) determined in advance by experiment or analysis (whether or not a determination B is established) (step S12). At this time, the travel over bump start point identification unit 119 performs the determination on the basis of the output from the motor rotation speed detection unit 113.

When it is determined in step S12 that the motor rotation speed is lower than the predetermined value M2 (that the determination B is established) (i.e. Yes), a determination is made as to whether or not the required driving force is at an upper limit value RDF_MAX (whether or not a determination C is established) (step S13). At this time, the drive control unit 110 determines whether or not the required driving force is at the upper limit value RDF_MAX.

When it is determined in step S13 that the required driving force is not at the upper limit value RDF_MAX (when the determination C is not established) (i.e. No), the routine returns to step S11, where the required driving force is increased gradually at a constant speed until the required driving force reaches the upper limit value RDF_MAX.

When it is determined in step S13 that the required driving force is at the upper limit value RDF_MAX (when the determination C is established) (i.e. Yes), on the other hand, a determination is made as to whether or not an elapsed time following establishment of this condition has reached a predetermined value T2 (a second time) determined in advance by experiment or analysis (step S14). At this time, the drive control unit 110 performs the determination using an inbuilt timer.

When it is determined in step S14 that the elapsed time has not reached the predetermined value T2 (i.e. No), the routine returns to step S14, where a similar determination is executed until the predetermined value T2 elapses.

When it is determined in step S14 that the elapsed time has reached the predetermined value T2 (i.e. Yes), on the other hand, it is determined that the vehicle 301 is incapable of traveling over the bump, and therefore a departure over bump impossible determination is established (step S15).

Next, the required driving force is controlled to zero regardless of the accelerator pedal depression amount (step S16). At this time, the drive control unit 110 sets the required driving force at zero regardless of the accelerator pedal depression amount.

By controlling the required driving force to zero after determining that the vehicle 301 cannot travel over the bump in this manner, damage to the motor 102 (for example, a demagnetization phenomenon caused by an increase in the temperature of a magnet of the motor or the like) occurring when the vehicle 301 is operated continuously at a high load can be avoided.

When it is determined in step S12 that the motor rotation speed equals or exceeds the predetermined value M2 (when the determination B is not established) (i.e. No), on the other hand, the vehicle 301 is determined to have started travelling over the bump, and therefore a travel over bump start determination is established (step S17).

Next, a required driving force RDF1 upon establishment of the travel over bump start determination is learned (step S18). At this time, the learning unit built into the drive control unit 110 learns the required driving force RDF1. In other words, the required driving force RDF1 required for the drive wheels 105 to travel over the bump is learned, and the learned value RDF1 is applied when the driven wheels 106 travel over the bump.

By learning the required driving force required for the drive wheels 105 to travel over the bump and applying the learned value when the driven wheels 106 travel over the bump in this manner, an optimum driving force for the driven wheels 106 to travel over the bump is obtained, and as a result, shock generated when the driven wheels 106 impinge on the bump can be reduced.

When it is determined that travel over the bump has started, the motor control is switched from the forcible driving force control, in which the required driving force is applied regardless of the accelerator pedal depression amount, to speed control in which the required driving force is controlled at a constant speed, with the result that the rotation speed of the motor 102 is controlled to a predetermined value M3 (a third rotation speed) determined in advance by experiment or analysis (step S19).

Next, a determination is made as to whether or not an elapsed time following establishment of the determination B has reached a predetermined value T3 (a third time) set in advance (step S20). At this time, the drive control unit 110 performs the determination using the inbuilt timer.

Note that the predetermined value T3 is a time calculated from the predetermined value M3 and a wheelbase of the vehicle 301, and is expressed by Equation (1), shown below.

$$T3 = \text{wheelbase}/M3 \times \text{coefficient } 1 \quad (1)$$

In other words, the predetermined value T3 is a time extending from a point at which the drive wheels 105 start to travel over the bump to a point immediately before the driven wheels 106 impinge on the bump.

When it is determined in step S20 that the elapsed time has not reached the predetermined value T3 (i.e. No), the routine returns to step S20, where a similar determination is executed until the predetermined value T3 elapses.

When it is determined in step S20 that the elapsed time has reached the predetermined value T3 (i.e. Yes), on the other hand, it is determined that the driven wheels 106 are about to impinge on the bump, and therefore, immediately before the bump, the motor control is switched from the speed control, in which the required driving force is controlled at a constant speed, to the forcible driving force control in which the required driving force is applied regardless of the accelerator pedal depression amount, with the result that the required driving force is controlled to the learned value RDF1 regardless of the accelerator pedal depression amount (step S21). At this time, the drive control unit 110 sets the required driving force at the learned value RDF1 regardless of the accelerator pedal depression amount.

In other words, by controlling the required driving force to the learned value RDF1 required for the drive wheels 105 to travel over the bump, an optimum driving force for the driven wheels 106 to travel over the bump is obtained, and as a result, troublesome accelerator pedal operations can be eliminated and shock generated when the driven wheels 106 impinge on the bump can be reduced. Moreover, a driving force deficiency does not occur, and therefore the vehicle 301 can travel over the bump reliably.

Next, a determination is made as to whether or not the elapsed time following establishment of the determination B has reached a predetermined value T4 (a fourth time) set in advance (step S22). At this time, the drive control unit 110 performs the determination using the inbuilt timer.

Note that the predetermined value T4 is a time calculated from the predetermined value M3 and the wheelbase of the vehicle 301, and is expressed by Equation (2), shown below.

$$T4 = \text{wheelbase}/M3 \times \text{coefficient2} \qquad (2)$$

In other words, the predetermined value T4 is a time extending from the point at which the drive wheels 105 start to travel over the bump to a point at which the driven wheels 106 finish traveling over the bump. At this time, T3 and T4 have a magnitude relationship of T3<T4.

When it is determined in step S22 that the elapsed time has not reached the predetermined value T4 (i.e. No), the routine returns to step S22, where a similar determination is executed until the predetermined value T4 elapses.

When it is determined in step S22 that the elapsed time has reached the predetermined value T4 (i.e. Yes), on the other hand, it is determined that the driven wheels 106 have finished travelling over the bump, or in other words that the vehicle 301 has finished travelling over the bump, and therefore a travel over bump completion determination is established (step S23).

Here, by calculating the time required for all of the vehicle wheels to travel over the bump from the predetermined value M3 and the wheelbase of the vehicle 301 and setting the calculated value as a determination condition relating to completion of travel over the bump in order to determine that all of the vehicle wheels have traveled over the bump, the vehicle 301 can travel over the bump reliably.

Next, the required driving force is controlled to zero regardless of the accelerator pedal depression amount (step S24). At this time, the drive control unit 110 sets the required driving force at zero regardless of the accelerator pedal depression amount. By controlling the required driving force to zero in this manner, a sensation of the vehicle 301 jumping forward can be suppressed.

Next, a determination is made as to whether or not the motor rotation speed has fallen to or below the predetermined value M3 (the third rotation speed) (step S25). At this time, the drive control unit 110 performs the determination on the basis of the output from the motor rotation speed detection unit 113.

When it is determined in step S25 that the motor rotation speed is higher than the predetermined value M3 (i.e. No), the antilock brake system 204 is operated (step S26) so as to increase a required braking force. The routine then returns to step S25, where a similar determination is executed until the motor rotation speed falls to or below the predetermined value M3. As a result, a sensation of the vehicle jumping forward can be suppressed, and troublesome accelerator pedal and brake pedal operations can be eliminated.

Note that by determining whether or not to apply braking force forcibly in order to reach a target value of the travel condition of the vehicle 301, or in other words so that the rotation speed of the motor 102 reaches the predetermined value M3 determined in advance, unintentional deceleration can be avoided, and as a result, a sense of discomfort experienced by the driver can be reduced.

In other words, the required driving force is controlled to zero regardless of the accelerator pedal depression amount after determining that travel over the bump is complete, whereupon a determination is made as to whether or not the target value of the travel condition of the vehicle 301 is satisfied (whether or not the motor rotation speed has fallen to or below the predetermined value M3), and when the motor rotation speed has still not fallen to or below the target value, the required braking force is increased forcibly (by operating the antilock brake system 204). In so doing, a sensation of the vehicle 301 jumping forward is suppressed, and as a result, a sense of discomfort (for example, a strong sense of deceleration or the like) experienced by the driver can be reduced.

When it is determined in step S25 that the motor rotation speed has fallen to or below the predetermined value M3 (i.e. Yes), on the other hand, the motor control is switched from the forcible driving force control, in which the required driving force is applied regardless of the accelerator pedal depression amount, to the speed control in which the required driving force is controlled at a constant speed, with the result that the rotation speed of the motor 102 is controlled to the predetermined value M3 determined in advance by experiment or analysis (step S27).

When the motor control is switched from the forcible driving force control to the normal control immediately after the travel over step completion determination is established in this manner, driving force is generated in accordance with the accelerator pedal depression amount, and as a result, travel may become unstable, but by switching to the speed control temporarily, this problem can be avoided.

Next, a determination is made as to whether or not the accelerator pedal depression amount is zero and a brake pedal depression amount equals or exceeds a predetermined value BRK1 (a brake depression amount) determined in advance by experiment or analysis (step S28). At this time, the drive control unit 110 performs the determination on the basis of the output from the accelerator pedal depression amount detection unit 114 and the brake stroke sensor 205.

By employing the accelerator pedal depression amount and the brake pedal depression amount in the determination condition in this manner, a situation in which the vehicle 301 jumps forward against the wishes of the driver at the moment where the motor control is switched from the speed control to the normal control (the driving force control) corresponding to the accelerator pedal depression amount can be avoided.

When it is determined in step S28 that the accelerator pedal depression amount is not zero or that the brake pedal depression amount is smaller than the predetermined value BRK1 (i.e. No), the routine returns to step S28, where a similar determination is executed until the determination condition is established.

When it is determined in step S28 that the accelerator pedal depression amount is zero and the brake pedal depression amount equals or exceeds the predetermined value BRK1 (i.e. Yes), on the other hand, the routine for controlling the vehicle 301 while travelling over the bump is determined to be complete, and therefore a travel over bump control routine completion condition is established (step S29).

Next, the motor control is switched from the speed control, in which the required driving force is controlled at a constant speed, to the normal control (the driving force control) corresponding to the accelerator pedal depression amount (step S30), whereupon the processing of FIG. 2 is terminated.

Note that as failsafe control respecting a desire of the driver to stop, when the driver depresses the brake pedal to or above the predetermined value BRK1 following establishment of the departure over bump determination, the departure over bump determination is immediately canceled and the required driving force is controlled to zero regardless of the accelerator pedal depression amount. The motor control is then switched to the normal control (the driving force control) corresponding to the accelerator pedal depression amount.

Results of control processing executed in a front motor/front wheel drive type electric vehicle in a case where the travel direction of the vehicle 301 is determined to be the forward travel direction and the vehicle 301 is capable of traveling over a bump will be described below with reference to a timing chart shown in FIG. 3.

Figure 3:
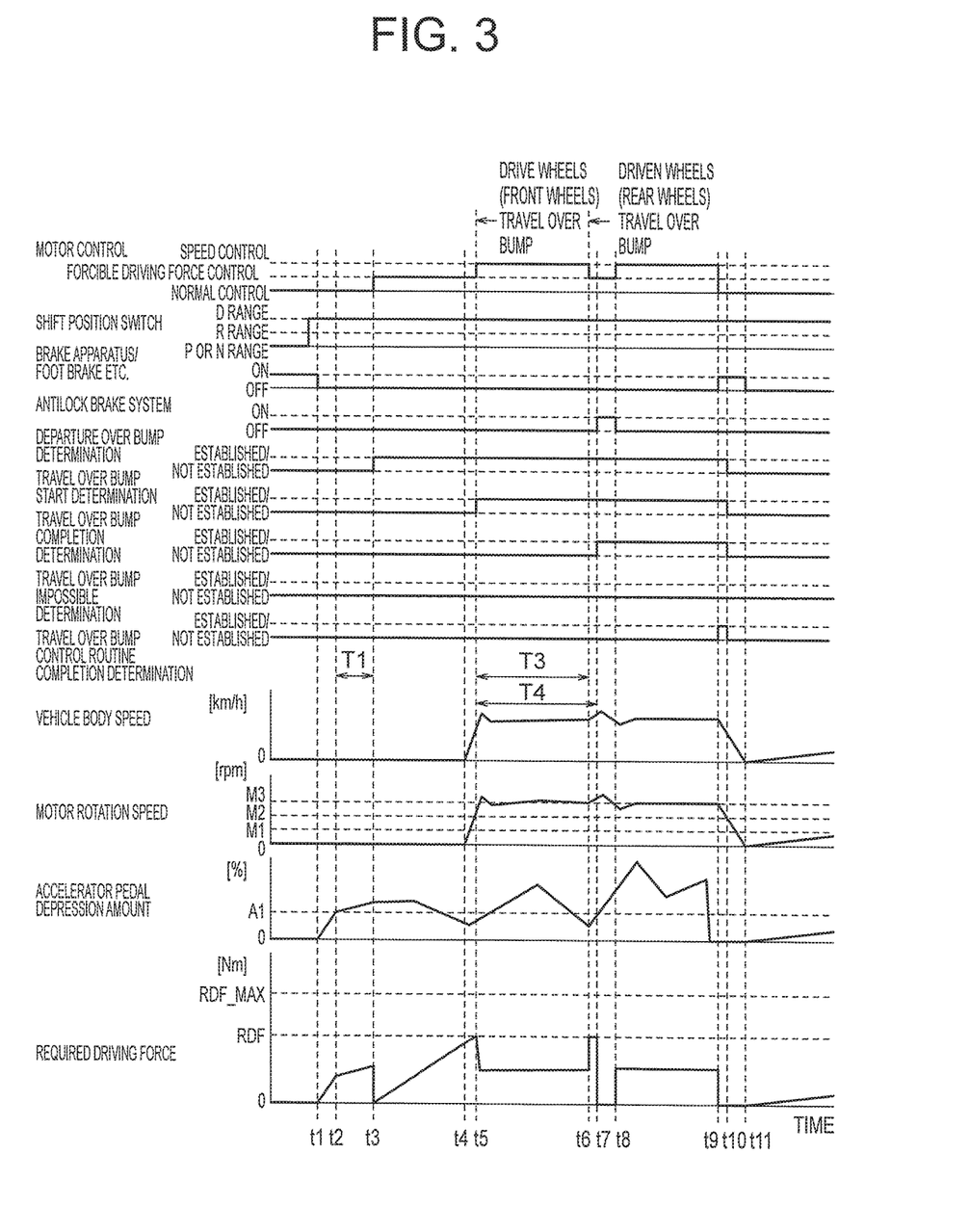
FIG. 3 is a timing chart showing results of the control processing executed by the vehicle control apparatus according to the first embodiment of this invention (in a case where travel over a bump is possible).

In FIG. 3, t1 is a timing at which the accelerator pedal is depressed when the motor control is the normal control (the driving force control) corresponding to the accelerator pedal depression amount. Further, t2 is a timing at which the accelerator pedal depression amount reaches the determination value A1 of the departure over bump determination.

In a period (T1) between t2 and t3, it is determined accurately that the drive wheels 105 of the vehicle 301 are about to travel over a bump during departure. Further, t3 is a timing which the required driving force is set at zero regardless of the accelerator pedal depression amount after the departure over bump determination is established and the motor control is switched from the normal control to the forcible driving force control. Furthermore, t3 is a timing at which the required driving force starts to be increased from zero at a constant speed regardless of the accelerator pedal depression amount.

t4 is a timing at which the drive wheels 105 of the vehicle 301 start to travel over the bump. Further, t5 is a timing at which the rotation speed of the motor 102 reaches a predetermined value such that the travel over bump start determination is established. Furthermore, t5 is a timing at which the required driving force RDF1 at that time is learned and the motor control is switched from the forcible driving force control to the speed control.

In a period (T3) between t5 and t6, it is determined accurately that the driven wheels 106 are directly in front of the bump. Further, t6 is a timing at which the predetermined value T3 elapses following establishment of the travel over bump start determination, the motor control is switched from the speed control to the forcible driving force control, and the required driving force is controlled to the required driving force RDF1 learned at the timing t5 regardless of the accelerator pedal depression amount. Furthermore, t6 is a timing at which the driven wheels 106 start to travel over the bump.

t7 is a timing at which the predetermined value T4 elapses following establishment of the travel over bump start determination and the required driving force is set at zero regardless of the accelerator pedal depression amount while maintaining the forcible driving force control as the motor control. Further, at the timing t7, the rotation speed of the motor 102 is determined to be higher than the predetermined value M3, and therefore the antilock brake system 204 is operated in order to increase the braking force forcibly.

In a period (T4) between t5 and t7, it is determined accurately that the driven wheels 106 have finished travel-ling over the bump. Further, at a timing t8, the rotation speed of the motor 102 is determined to have fallen to or below the predetermined value M3, and therefore the antilock brake system 204 is stopped, the motor control is switched from the forcible driving force control to the speed control, and control is started to set the rotation speed of the motor 102 at the predetermined value M3 regardless of the accelerator pedal depression amount.

t9 is a timing at which the travel over bump control routine completion determination is established and the motor control is switched from the speed control to the normal control (the driving force control) corresponding to the accelerator pedal depression amount. Further, t10 is a timing at which departure over bump determination, travel over bump start determination, travel over bump completion determination, and travel over bump control routine completion determination flags are reset. Furthermore, t11 is a timing at which the required driving force starts to shift in response to the accelerator pedal depression amount while the motor control is the normal control (the driving force control) corresponding to the accelerator pedal depression amount.

Results of control processing executed in a front motor/front wheel drive type electric vehicle in a case where the travel direction of the vehicle 301 is determined to be the forward travel direction and the vehicle 301 is incapable of traveling over a bump will be described below with reference to a timing chart shown in FIG. 4.

Figure 4:
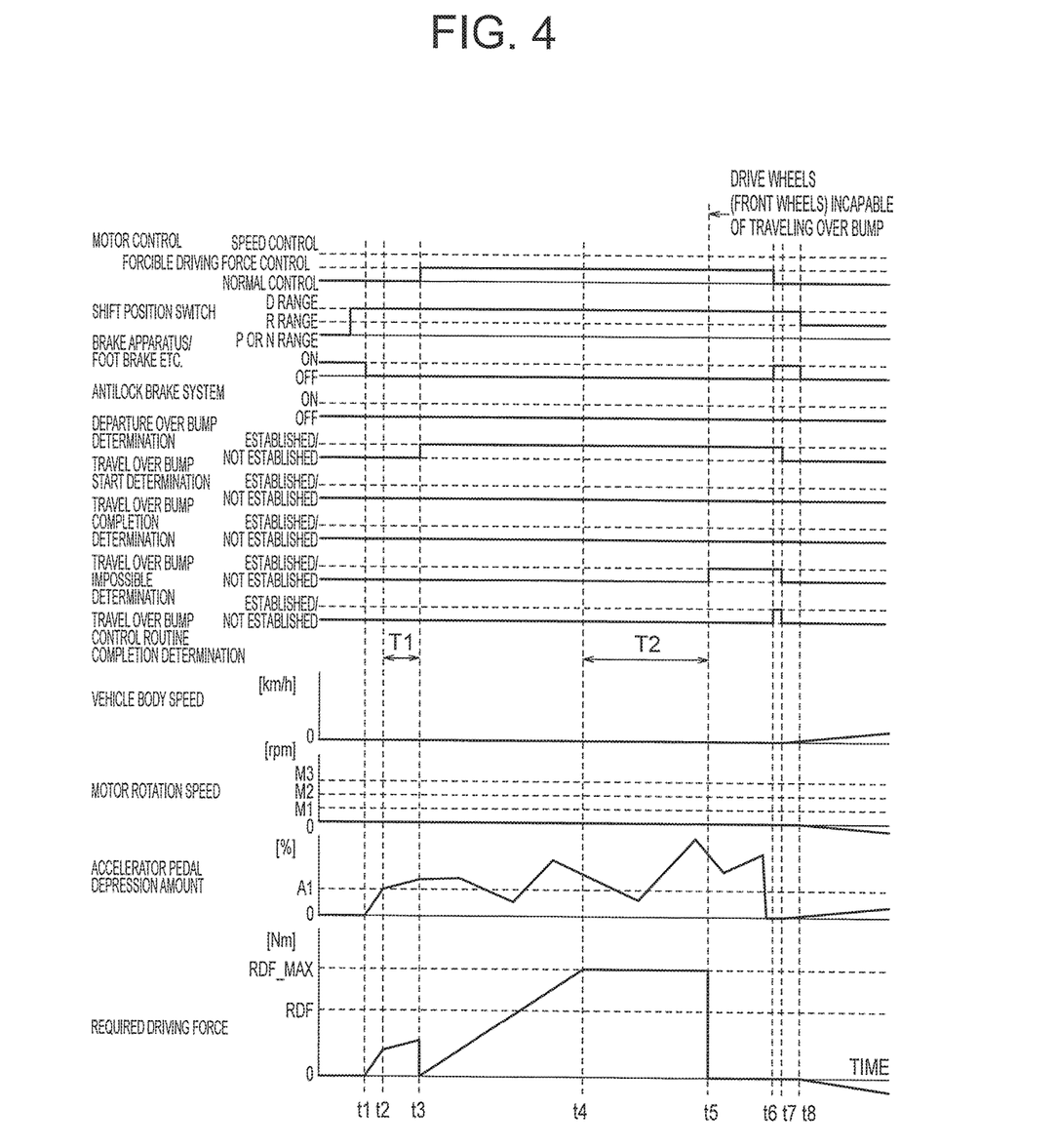
FIG. 4 is a timing chart showing results of the control processing executed by the vehicle control apparatus according to the first embodiment of this invention (in a case where travel over a bump is not possible).

In FIG. 4, t1 is a timing at which the accelerator pedal is depressed when the motor control is the normal control (the driving force control) corresponding to the accelerator pedal depression amount. Further, t2 is a timing at which the accelerator pedal depression amount reaches the determination value A1 of the departure over bump determination.

In a period (T1) between t2 and t3, it is determined accurately that the drive wheels 105 of the vehicle 301 are about to travel over a bump during departure. Further, t3 is a timing which the required driving force is set at zero regardless of the accelerator pedal depression amount after the departure over bump determination is established and the motor control is switched from the normal control to the forcible driving force control. Furthermore, t3 is a timing at which the required driving force starts to be increased from zero at a constant speed regardless of the accelerator pedal depression amount.

In a period from t3 to t4, the required driving force increases from zero to the upper limit value RDF_MAX at a constant speed. Further, t4 is a timing at which the required driving force reaches the upper limit value RDF_MAX.

t5 is a timing at which the predetermined value T2 elapses after the required driving force reaches the upper limit value RDF_MAX such that the travel over bump impossible determination is established. Further, at the timing t5, since the travel over bump impossible determination is established, the required driving force is set at zero regardless of the accelerator pedal depression amount.

t6 is a timing at which the travel over bump control routine completion determination is established and the motor control is switched from the forcible driving force control to the normal control (the driving force control) corresponding to the accelerator pedal depression amount. Further, t7 is a timing at which the departure over bump determination, travel over bump impossible determination, and travel over bump control routine completion determination flags are reset. Furthermore, t8 is a timing at which the required driving force starts to shift in response to the accelerator pedal depression amount while the motor control is the normal control (the driving force control) corresponding to the accelerator pedal depression amount.

According to the first embodiment, as described above, the departure over bump identification unit identifies departure over a bump, in which the electric vehicle travels over a bump in order to depart, when the motor rotation speed is equal to or lower than a predetermined first rotation speed and the accelerator pedal depression amount remains at or above a predetermined accelerator pedal depression amount continuously for a predetermined first period, and when departure over a bump is identified, the drive control unit sets the required driving force of the motor at zero, regardless of the accelerator pedal depression amount, and then increases the required driving force at a constant speed.

As a result, departure over a bump can be identified accurately, and the required driving force can be controlled to an appropriate value when departure over a bump is identified.

The invention claimed is:

1. A vehicle control apparatus for an electric vehicle that travels using power from a motor, comprising:
 a motor rotation speed detection unit that detects a rotation speed of the motor as a motor rotation speed;
 an accelerator pedal depression amount detection unit that detects a depression amount of an accelerator pedal of the electric vehicle as an accelerator pedal depression amount;
 a departure over bump identification unit that identifies departure over a bump, in which the electric vehicle travels over the bump when the motor rotation speed is equal to or lower than a predetermined first rotation speed and the accelerator pedal depression amount remains at or above a predetermined accelerator pedal depression amount continuously for a predetermined first period; and
 a drive control unit that sets a required driving force of the motor at zero, regardless of the accelerator pedal depression amount, and then increases the required driving force at a constant speed, when departure over the bump is identified.

2. The vehicle control apparatus according to claim 1, further comprising:
 a travel over bump start point identification unit that identifies a start point of travel over the bump, at which the electric vehicle starts to travel over the bump, when the motor rotation speed reaches or exceeds a predetermined second rotation speed while the drive control unit increases the required driving force of the motor after departure over the bump has been identified; and
 a learning unit that learns a required driving force required by the electric vehicle at a point at which the start point of travel over the bump is identified.

3. The vehicle control apparatus according to claim 1, wherein the drive control unit controls the motor rotation speed to a predetermined third rotation speed regardless of the accelerator pedal depression amount from a point at which the start point of travel over the bump is identified to a point at which a vehicle wheel of the electric vehicle that has not yet traveled over the bump impinges on the bump.

4. The vehicle control apparatus according to claim 2, wherein the drive control unit controls the motor rotation speed to a predetermined third rotation speed regardless of the accelerator pedal depression amount from a point at which the start point of travel over the bump is identified to a point at which a vehicle wheel of the electric vehicle that has not yet traveled over the bump impinges on the bump.

5. The vehicle control apparatus according to claim 2, wherein the drive control unit controls the required driving force of the motor to the required driving force learned by the leaning unit regardless of the accelerator pedal depression amount when a vehicle wheel of the electric vehicle that has not yet traveled over the bump impinges on the bump.

6. The vehicle control apparatus according to claim 3, wherein when all vehicle wheels of the electric vehicle have traveled over the bump, the drive control unit determines that travel over the bump is complete and controls the motor rotation speed to the third rotation speed regardless of the accelerator pedal depression amount, and when the motor rotation speed is higher than the third rotation speed, the drive control unit reduces the motor rotation speed to the third rotation speed by forcibly applying a brake to the motor.

7. The vehicle control apparatus according to claim 4, wherein when all vehicle wheels of the electric vehicle have traveled over the bump, the drive control unit determines that travel over the bump is complete and controls the motor rotation speed to the third rotation speed regardless of the accelerator pedal depression amount, and when the motor rotation speed is higher than the third rotation speed, the drive control unit reduces the motor rotation speed to the third rotation speed by forcibly applying a brake to the motor.

8. The vehicle control apparatus according to claim 6, wherein when the motor rotation speed falls to or below the third rotation speed after travel over the bump is determined to be complete, the drive control unit controls the motor rotation speed to the third rotation speed regardless of the accelerator pedal depression amount.

9. The vehicle control apparatus according to claim 7, wherein when the motor rotation speed falls to or below the third rotation speed after travel over the bump is determined to be complete, the drive control unit controls the motor rotation speed to the third rotation speed regardless of the accelerator pedal depression amount.

10. The vehicle control apparatus according to claim 8, wherein when the accelerator pedal depression amount is zero and a depression amount of a brake pedal of the electric vehicle equals or exceeds a predetermined brake depression amount after the motor rotation speed reaches the third rotation speed once travel over the bump is determined to be complete, the drive control unit determines that a travel over bump control routine is complete, and switches to control in which the required driving force of the motor is controlled in accordance with the accelerator pedal depression amount.

11. The vehicle control apparatus according to claim 9, wherein when the accelerator pedal depression amount is zero and a depression amount of a brake pedal of the vehicle equals or exceeds a predetermined brake depression amount after the motor rotation speed reaches the third rotation speed once travel over the bump is determined to be complete, the drive control unit determines that a travel over bump control routine is complete, and switches to control in which the required driving force of the motor is controlled in accordance with the accelerator pedal depression amount.

12. The vehicle control apparatus according to claim 2, wherein when the motor rotation speed remains below the second rotation speed continuously for a predetermined second period even after setting the required driving force of the motor at an upper limit value while the drive control unit increases the required driving force of the motor after departure over the bump has been identified, the drive control unit sets the required driving force of the motor at zero regardless of the accelerator pedal depression amount.

13. A vehicle control method for an electric vehicle that travels using power from a motor, comprising:
- a motor rotation speed detection step for detecting a rotation speed of the motor as a motor rotation speed;
- an accelerator pedal depression amount detection step for detecting a depression amount of an accelerator pedal of the electric vehicle as an accelerator pedal depression amount;
- a departure over bump identification step for identifying departure over a bump, in which the electric vehicle travels over the bump when the motor rotation speed is equal to or lower than a predetermined first rotation speed and the accelerator pedal depression amount remains at or above a predetermined accelerator pedal depression amount continuously for a predetermined first period; and
- a drive control step for setting a required driving force of the motor at zero, regardless of the accelerator pedal depression amount, and then increasing the required driving force at a constant speed, when departure over the bump is identified.

* * * * *